(12) United States Patent
Srinivasan et al.

(10) Patent No.: US 12,019,576 B2
(45) Date of Patent: Jun. 25, 2024

(54) SYSTEMS AND METHODS TO TRANSPORT MEMORY MAPPED TRAFFIC AMONGST INTEGRATED CIRCUIT DEVICES

(71) Applicant: XILINX, INC., San Jose, CA (US)

(72) Inventors: Krishnan Srinivasan, San Jose, CA (US); Ygal Arbel, Morgan Hill, CA (US); Sagheer Ahmad, Cupertino, CA (US); Abbas Morshed, Los Altos, CA (US)

(73) Assignee: XILINX, INC., San Jose, CA (US)

( * ) Notice: Subject to any disclaimer, the term of this patent is extended or adjusted under 35 U.S.C. 154(b) by 53 days.

(21) Appl. No.: 17/879,675

(22) Filed: Aug. 2, 2022

(65) Prior Publication Data

US 2024/0045822 A1    Feb. 8, 2024

(51) Int. Cl.
G06F 13/40    (2006.01)
(52) U.S. Cl.
CPC ...... *G06F 13/4027* (2013.01); *G06F 2213/40* (2013.01)
(58) Field of Classification Search
CPC ............................ G06F 3/4027; G06F 2213/40
See application file for complete search history.

(56) References Cited

U.S. PATENT DOCUMENTS

| | | | | |
|---|---|---|---|---|
| 10,963,421 | B1 * | 3/2021 | Swarbrick | G06F 15/7825 |
| 11,615,052 | B1 * | 3/2023 | Surendran | G06F 15/7892 |
| | | | | 712/1 |
| 2019/0266125 | A1 * | 8/2019 | Swarbrick | H04L 41/0813 |
| 2019/0303323 | A1 * | 10/2019 | Swarbrick | G06F 1/06 |
| 2020/0301830 | A1 * | 9/2020 | Mathew Abraham | |
| | | | | G06F 13/4027 |
| 2021/0349820 | A1 * | 11/2021 | Kutch | G06F 12/0802 |
| 2023/0066736 | A1 * | 3/2023 | Srinivasan | G06F 13/385 |
| 2023/0141709 | A1 * | 5/2023 | Srinivasan | G06F 13/4282 |
| | | | | 710/314 |
| 2023/0291405 | A1 * | 9/2023 | Ahmad | H03K 19/17736 |
| | | | | 326/41 |

OTHER PUBLICATIONS

International Search Report and Written Opinion for PCT/US2023/022605 dated Aug. 3, 2023.

(Continued)

*Primary Examiner* — Henry Tsai
*Assistant Examiner* — Christopher A Daley
(74) *Attorney, Agent, or Firm* — Patterson + Sheridan, LLP

(57) ABSTRACT

Embodiments herein describe a decentralized chip-to-chip (C2C) interface architecture to transport memory mapped traffic amongst heterogeneous IC devices in a packetized, scalable, and configurable manner. An IC chip may include functional circuitry that exchanges memory-mapped traffic with an off-chip device, a NoC that packetizes and de-packetizes memory-mapped traffic and routes the packetized memory-mapped traffic between the functional circuitry and the off-chip device, and NoC inter-chip bridge (NICB) circuitry that interfaces between the NoC and the off-chip device over C2C interconnections. The NICB circuitry may be configurable in a full mode to map packetized memory-mapped traffic to the C2C interconnections in a 1:1 fashion and in a compressed to map packetized memory-mapped traffic to the C2C interconnections in a less-than 1:1 fashion.

20 Claims, 16 Drawing Sheets

(56) References Cited

OTHER PUBLICATIONS

Ashkan Beyranvand Nejad, et al., "A hardware/software platform for QoS bridging over multi-chip NoC-based systems", Parallel Computing, vol. 39, No. 9, Apr. 28, 2013.
Liao, Xiongfei, et al., "Exploring AMBA AXI on-Chip interconnection for TSV-based 3D SoCs", 3D SYstems Integration Conference 2011 IEEE International, IEEE, Jan. 31, 2012.
Morgan, Ahmed, et al., "NoC2: An Efficient Interfacing Approach for Heavily-Communicating NoC-Based Systems", IEEE Access, IEEE, vol. 8, Oct. 10, 2020.

* cited by examiner

| | Operation | RD Next Entry ID | WR Next Entry ID |
|---|---|---|---|
| VC0 | RESET | 0 | 0 |
| | WR | 0 | 1 |
| | WR | 0 | 0 (FULL) |
| | RD | 1 | 0 |
| | RD | 0 | 0 (EMPTY) |
| VC1 | RESET | 2 | 2 |
| | WR | 2 | 3 |
| | WR | 2 | 4 |
| | WR | 2 | 2 (FULL) |
| | RD | 3 | 2 |
| | RD | 4 | 2 |
| | RD | 2 | 2 (EMPTY) |

| CTRL | Dest ID | Num Bits | Granularity | Available Bits | Registers/per map | Num addr map | Num Flops | Comments |
|---|---|---|---|---|---|---|---|---|
| 6 | 12 | 48 | 16 | 32 | 4 | 32 | 4672 | 4 registers: BASE, SIZE, MASK, ADD, 64KB granularity |
| 6 | 12 | 48 | 20 | 28 | 4 | 32 | 3584 | 4 registers: BASE, SIZE, MASK, ADD, 1MB granularity |
| 6 | 12 | 48 | 26 | 22 | 4 | 16 | 1408 | 4 registers: BASE, SIZE, MASK, ADD, 64MB granularity |
| 6 | 12 | 48 | 30 | 18 | 4 | 16 | 1152 | 4 registers: BASE, SIZE, MASK, ADD, 1GB granularity |

FIG. 17

SYSTEMS AND METHODS TO TRANSPORT MEMORY MAPPED TRAFFIC AMONGST INTEGRATED CIRCUIT DEVICES

TECHNICAL FIELD

Examples of the present disclosure generally relate to transporting memory mapped traffic amongst integrated circuit devices.

BACKGROUND

A system-on-a-chip (SoC) combines a variety of sub-systems in a single IC device. A SoC may include a packet-switched network-on-a-chip (NoC) to provide intra-chip communications amongst the sub-systems. SoCs may provide a variety of benefits over multi-chip architectures.

Whereas multi-chip architectures may be useful for replaceability and interchangeability of the various sub-systems, and to decouple development cycles of the various subsystems from one another. Decoupling may be useful to permit mixing and matching of different types and versions of the various sub-systems.

Mufti-chip architectures utilize various architectures for inter-chip or chip-to-chip (C2C) communications. Conventional C2C architectures are fixed or hardened. Conventional C2C architectures are not configurable for communications amongst heterogeneous IC devices. Conventional C2C architectures handle memory-mapped traffic in restrictive manners.

SUMMARY

Techniques for transporting memory mapped traffic amongst integrated circuit devices are described. One example is a an integrated circuit (IC) chip that includes functional circuitry that exchanges memory mapped traffic with an off-chip device, network-on-a-chip (NoC) circuitry that packetizes and de-packetizes memory mapped traffic received from and directed to the functional circuitry and routes the packetized memory mapped traffic between the functional circuitry and the off-chip device, and NoC inter-chip bridge (NICB) circuitry that interfaces between the NoC circuitry and the off-chip device to exchange the packetized memory mapped traffic with the off-chip device over chip-to-chip (C2C) interconnections.

Another example described herein is an IC device that includes functional circuitry that sends and receives memory-mapped data to and from an off-chip device, NoC circuitry that provides the functional circuitry with a virtual interface to other device(s), and NICE circuitry that provides the NoC circuitry with a virtual interface to the off-chip device Another example described herein is a method that includes generating memory mapped traffic that includes a memory access request, packetizing the memory access request, routing the packetized memory access request through an on-chip packet-switched communication network at first transmission rate, and forwarding the packetized memory access request from the on-chip packet-switched communication network to an off-chip device, in segments, over a set of C2C interconnections at a second transmission rate, where the second transmission rate is equal to or greater than the first transmission rate.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 17 illustrates a table of address decoder parameters, according to an embodiment.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
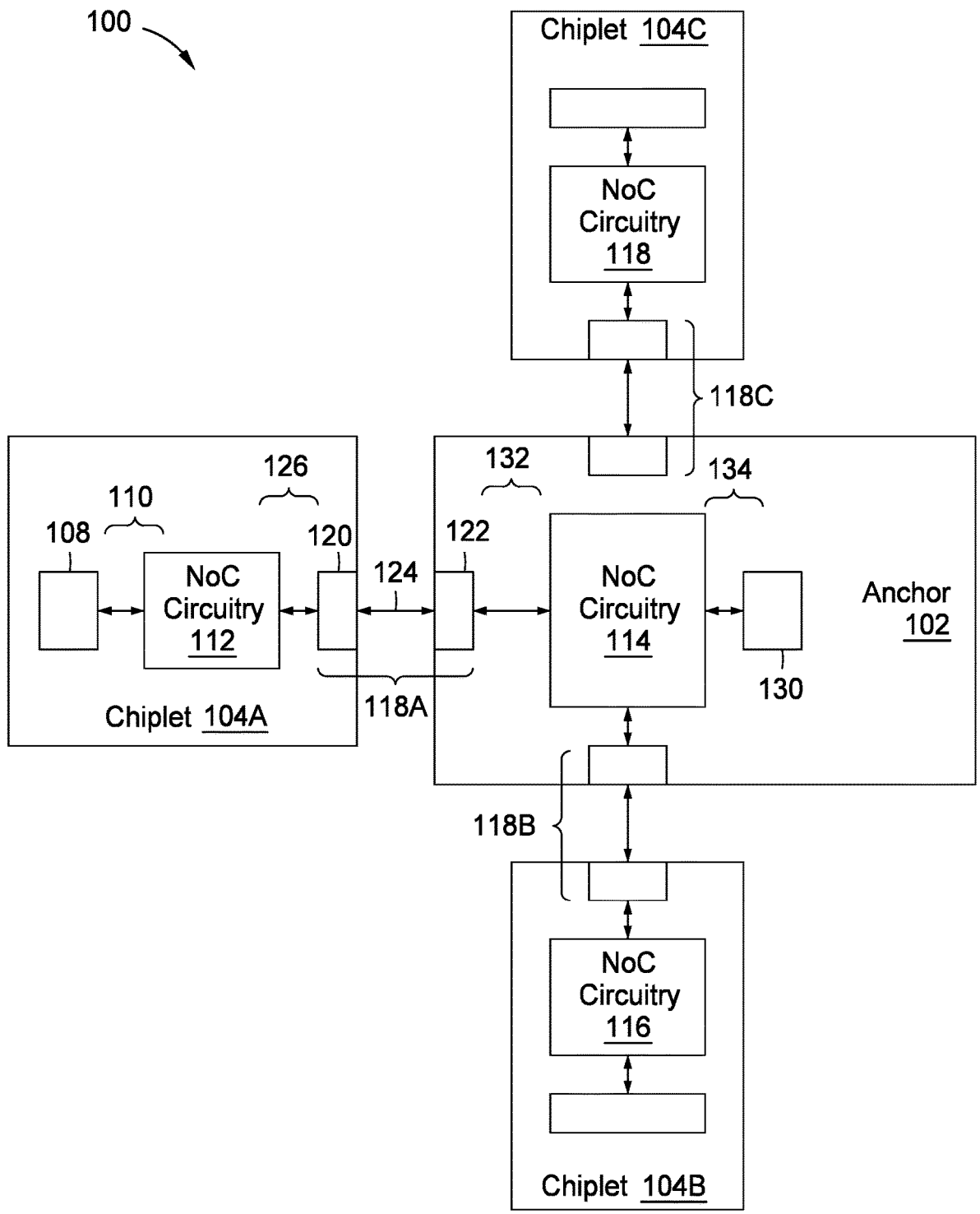
FIG. 1 is a block diagram of a system, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have ail the aspects or advantages shown. An aspect or an advantage described in conjunction with a particular example is not necessarily limited to that example and can be practiced in any other examples even if not so illustrated, or if not so explicitly described.

Embodiments herein describe a decentralized chip-to-chip (C2C) interface architecture to transport memory mapped traffic amongst heterogeneous IC devices in a packetized, scalable, and configurable manner. The C2C interface architecture may serve as a virtualized interface to an off-chip device, The C2C interface architecture may configured as a plug-and-play architecture. Examples are provided below with reference to C2C communications amongst an anchor IC device or chip, and one or more chiplets. Methods and systems disclosed herein are not, however, limited to anchor/chiplet architectures.

Unless specified otherwise herein, the terms bandwidth, phits, and flits have the meanings provided below.

A network has a width w, and a transmission rate f. A bandwidth (BW) of the network may be determined as BW=w*f. The amount of data transferred in a single cycle is called a physical unit or phit. The width w of a network is also equal to the phit size. The bandwidth of the network may also be defined in terms of phit/sec.

A message may be broken down into segments of fixed length entities called packets. A packet may be broken down into message flow control units or flits. A flit is a unit amount of data when the message is transmitting in link-level. Inter-router transfers are constructed in terms of phits. Whereas switching techniques deal in terms of flits.

FIG. 1 is a block diagram of a system 100, according to an embodiment. System 100 includes a first integrated circuit (IC) chip, illustrated here as an anchor 102, connected to multiple heterogeneous IC chips, illustrated here as chiplets 104A-104C, over respective C2C interface circuitry 118A, 118B, and 118C.

Anchor 102 may include, without limitation, a processor subsystem, a memory subsystem, and/or programmable/configurable circuitry. Chiplets 104A-104C may include respective dedicated functional circuitry such as, without limitation, an artificial intelligence engine (AIE) and/or memory.

In the example of FIG. 1, chiplet 104A includes functional circuitry 108 that sends and receives memory-mapped traffic 110 to and from an off-chip device, illustrated here as anchor 102. Memory-mapped traffic 110 may include memory write and/or memory read requests, collectively referred to herein as memory access requests.

For illustrative purposes, memory access requests are described below as originating at functional circuitry 108 and directed to functional circuitry 130 of anchor 102. Functional circuitry 130 may include, without limitation, a direct memory access (DMA) controller. The DMA controller may, in turn, access memory within anchor 102 and/or memory in chiplet 104B or 104C. In other embodiments, memory access requests may originate at anchor 102.

Memory-mapped traffic 110 may be formatted in accordance with an Advanced eXtensible Interface (AXI) on-chip communication bus protocol developed by ARM of Cambridge, England. Memory-mapped traffic 110 may be formatted in accordance with an AXI3 or AXI4 memory mapped mode. Memory-mapped traffic 110 is not, however, limited to an AXI protocol.

Chiplet 104A further includes network-on-a-chip (NoC) circuitry 112 that provides an on-chip packet-switched communications network. NoC circuitry 112 may include one or more NoC packet switches (NPSs). NoC circuitry 112 may present functional circuitry 108 with a virtual interface to the off-chip memory device.

Anchor 102, chiplet 104B, and chiplet 104C include respective NoC circuitry 114, 116, and 118 to present corresponding on-chip packet-switched communications networks.

The on-chip packet-switched communications networks are independent of one another. In other words, each packet-switched communications network is local to the respective chip (anchor or chiplet), such that addressing of each NoC terminates within the respective IC chip. Addresses and other control structures for received transmissions (e.g., system management identifier (SMID) and/or destination identifier (DEST-ID)), may be re-regenerated at the respective C2C interface circuitry, such as described in one or more examples herein.

C2C interface circuitry 118A, 118B, and 118C interface between NoC circuitry 114 of anchor 102 and the NoC circuitry of respective chiplets 104A-104C. C2C interface circuitry 118A includes NoC inter-chip bridge (NICB) circuitry 120, NICB circuitry 122, and interconnections 124. NICB circuitry 120 may present NoC circuitry 112 with a virtual interface to anchor 102. NICB circuitry 122 may present NoC circuitry 114 with a virtual interface to chiplet 104A.

C2C interface circuitry 118B and 118C may be similar or identical to C2C interface circuitry 118A.

Anchor 102, chiplet 104A, 104B, and/or 104C may include multiple sets of NICB circuitry.

Figure 2:
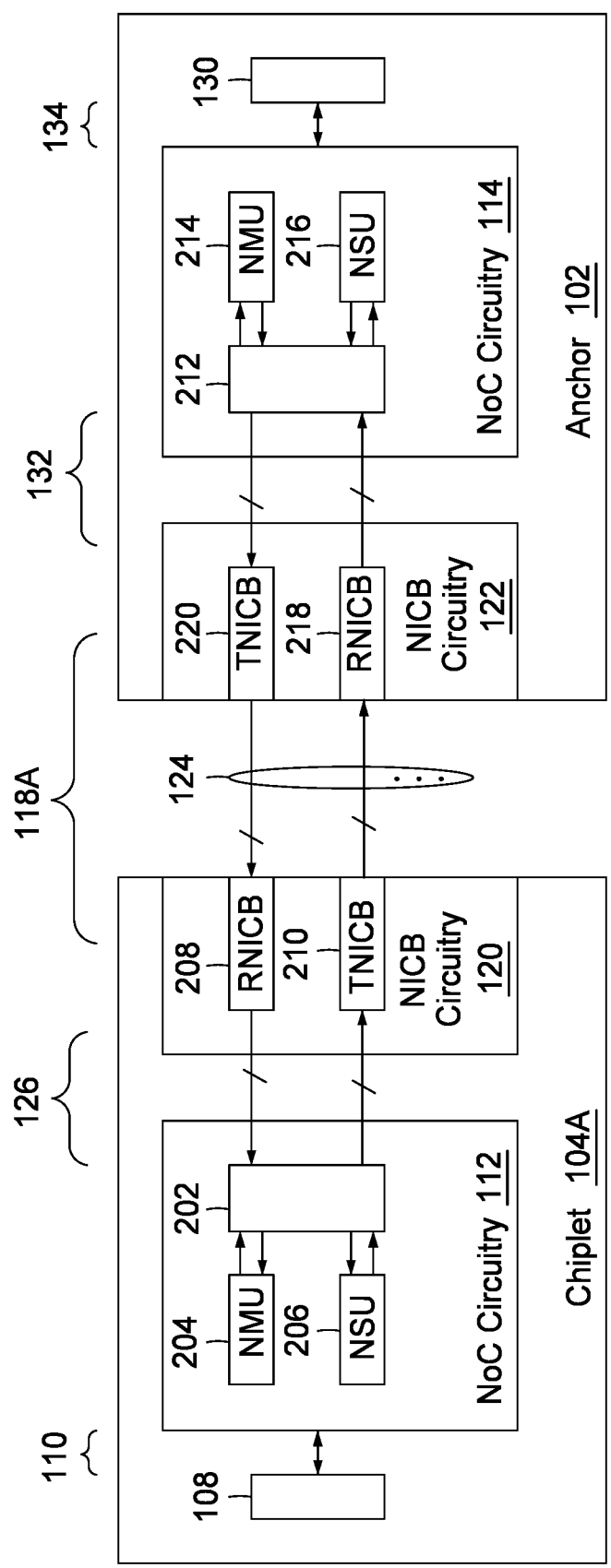
FIG. 2 is a block diagram of a portion of the system, according to an embodiment.

FIG. 2 is a block diagram of a portion of system 100, according to an embodiment.

In the example of FIG. 2, NoC circuitry 112 includes a NPS 202, NoC master unit (NMU) circuitry 204, and NoC slave unit (NSU) circuitry 206.

NMU circuitry 204 interfaces between functional circuitry 108 and NPS 202 for memory access requests that originate from functional circuitry 108. Among other tasks, NMU circuitry 204 packetizes memory access requests that originate from functional circuitry 108 based on a NoC packet protocol (NPP) of NoC circuitry 112, and de-packetizes responses to the requests.

NSU circuitry 206 interfaces between functional circuitry 108 and NPS 202 for memory access requests that originate from other device(s), such as from anchor 102 or another chiplet. Among other tasks, NSU circuitry 206 de-packetizes memory access requests that originate from other device(s), and packetizes responses to the requests.

NoC circuitry 114 includes a NPS 212, a NMU circuitry 214, and a NSU circuitry 216. NMU circuitry 214 interfaces between functional circuitry 108 and NPS 212 for memory access requests that originate from functional circuitry 130. Among other tasks, NMU circuitry 214 packetizes memory access requests that originate from functional circuitry 130 based on a NPP of NoC circuitry 114.

NSU circuitry 216 interfaces between functional circuitry 130 and NPS 212 for memory access requests that originate off-chip, such as from chiplet 104A or another chiplet. Among other tasks, NSU circuitry 216 de-packetizes memory access requests that originate off-chip.

Further in FIG. 2, NICB circuitry 120 includes receive NoC inter-chip bridge (RNICB) circuitry 208, and transmit NoC inter-chip bridge (TNICB) circuitry 210. NICB circuitry 122 includes RNICB circuitry 218 and TNICB circuitry 220.

For a memory access request that originates at functional circuitry 108, NMU circuitry 204 packetizes the access request into a j-bit flit, NPS 202 communicates the j-bit flit to TNICB circuitry 210 over interconnections 126, TNICB circuitry 210 communicates contents of the j-bit flit, in segments, over interconnections 124 to RNICB circuitry 218, RNICB circuitry 218 combines the segments to re-create the j-bit flit and forwards the j-bit flit to NoC circuitry 114 where NSU circuitry 216 de-packetizes the memory access request from the j-bit flit, and functional circuitry 130 processes the memory access request.

Functional circuitry 130 may send a response to the memory access request to functional circuitry 108 through NSU circuitry 216, NPS 212, TNICB circuitry 220, RNICB circuitry 208, NPS 202, and NMU circuitry 204, in a similar fashion.

NoC circuitry 112 may include one or more additional NPSs to provide other functional circuitry of chiplet 104A with an interface to the packet-switched communication network of NoC circuitry 112.

NoC circuitry 114 may include one or more additional NPSs to provide other functional circuitry of anchor 102 with an interface to the packet-switched communication network of NoC circuitry 114.

In an embodiment. NoC circuitry 112 and/or NICB circuitry 120 are provided as a pod for a chiplet. The pod may be provided as code for inclusion in a fabrication process or as a physical device. The pod may include one NMU, one NSU, and one NPS (e.g., a hybrid switch). In the NMU, address decoding may be established with a reduced set of remap registers.

TNICB circuitry 210 and/or TNICB circuitry 220 may perform one or more of the following operations:
flow control;
signal mapping from the NPP to interconnections 124; and
error correction code (ECC) generation.

RNICB circuitry 208 and/or RNICB circuitry 218 may perform one or more of the following operations:
flow control;
signal mapping from interconnections 124 to the NPP;
ECC checking and poison bit generation;
ECC generation for NPS (e.g., to conform to NoC requirements);
SMID remapping;
address translation;
destination ID generation;
read interleaving and reordering; and
write tracking.

Figure 3:
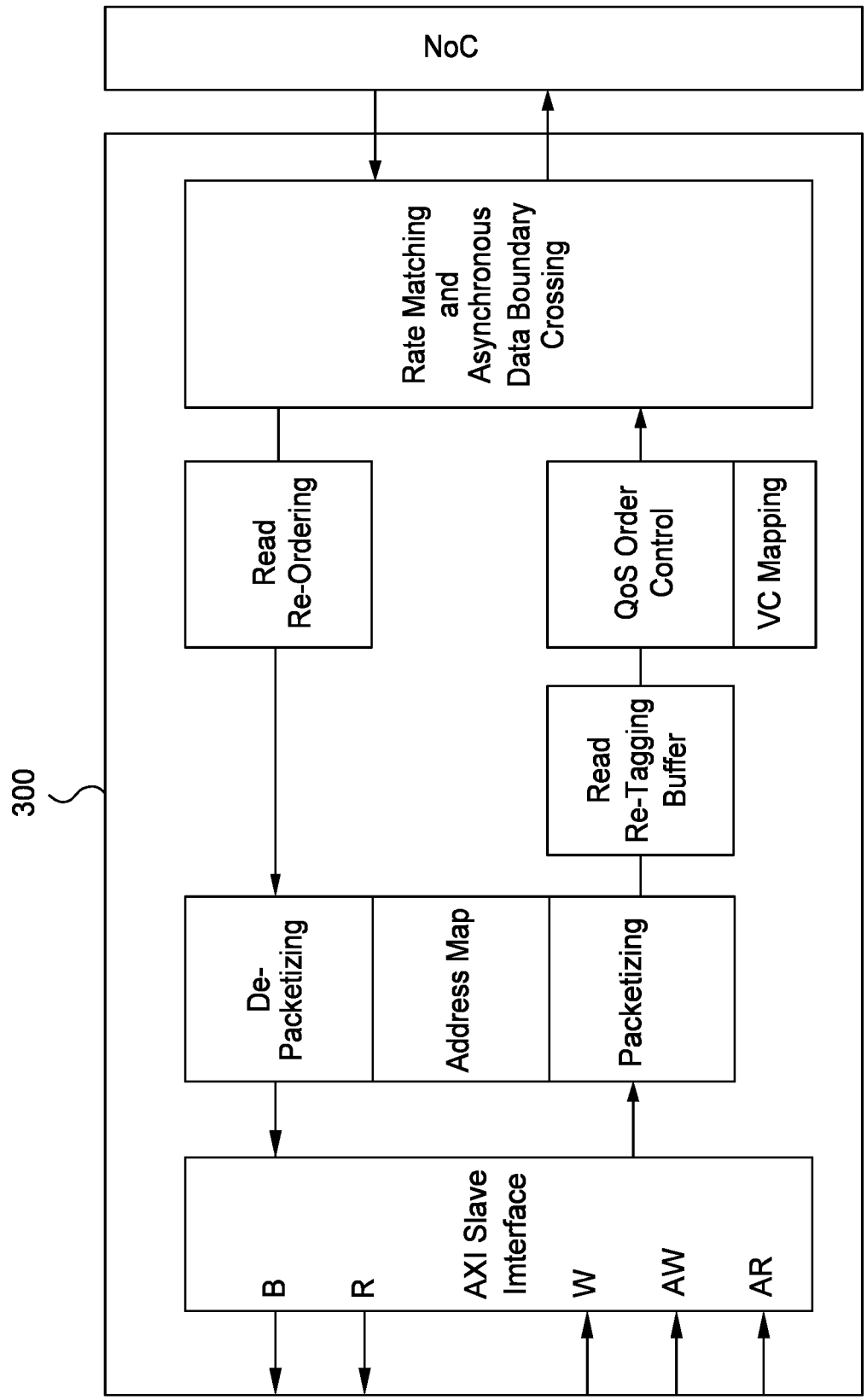
FIG. 3 is a block diagram of network-on-a-chip master unit (NMU) circuitry, according to an embodiment.

FIG. 3 is a block diagram of NMU circuitry 300, according to an embodiment. NMU circuitry 204 and/or NMU circuitry 214 may include one or more features of NMU circuitry 300.

Figure 4:
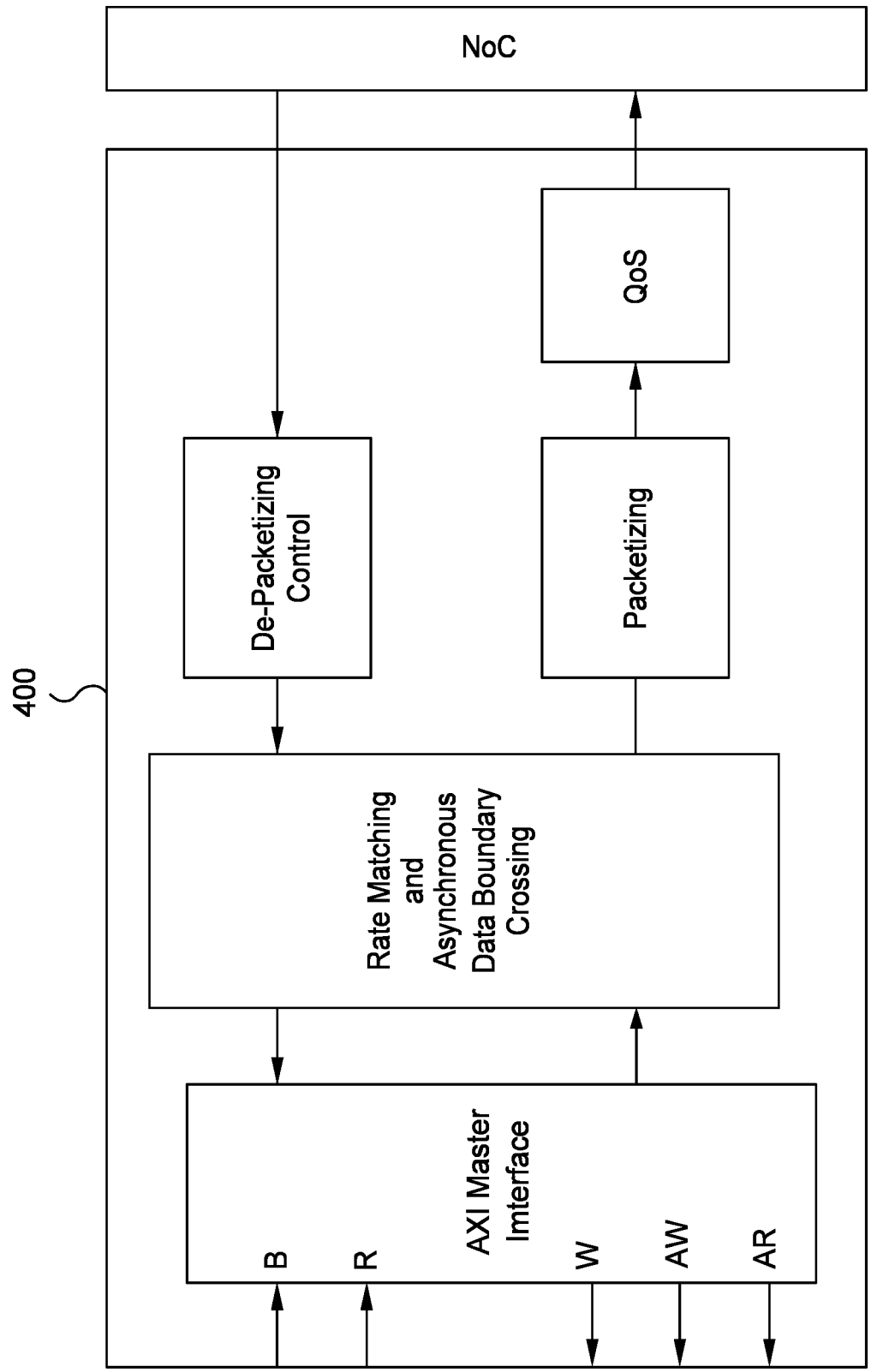
FIG. 4 is a block diagram of network-on-a-chip slave unit (NSU) circuitry, according to an embodiment.

FIG. 4 is a block diagram of NSU circuitry 400, according to an embodiment. NSU circuitry 206 and/or NSU circuitry 216 may include one or more features of NSU circuitry 400.

Figure 5:
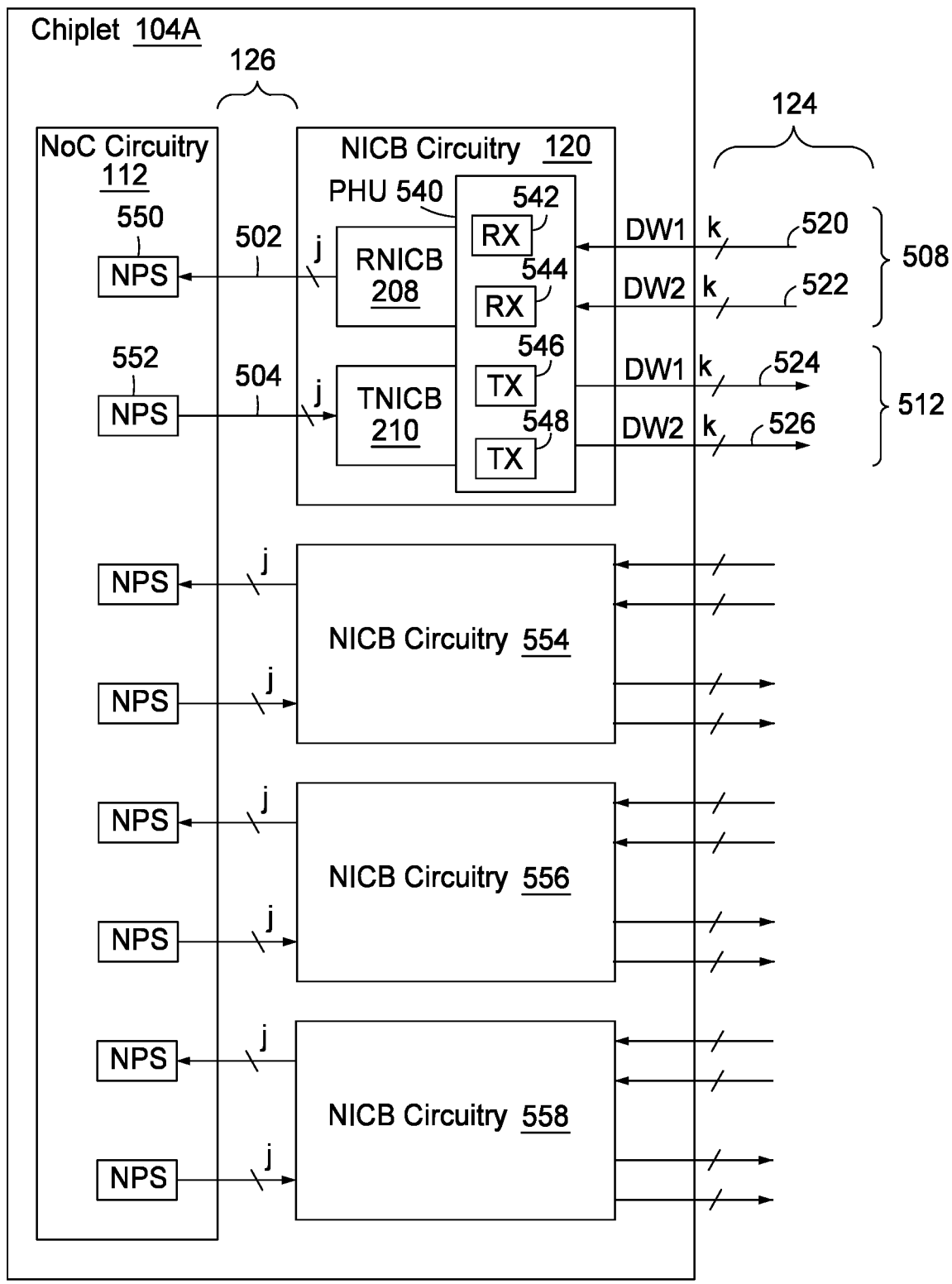
FIG. 5 is a block diagram of a portion of a chiplet, according to an embodiment.

FIG. 5 is a block diagram of a portion of chiplet 104A, according to an embodiment.

In the example of FIG. 5, interconnections 126 include a first set of j interconnections 502 that provide j-bit flits from RNICB circuitry 208 to a NPS 550 of NoC circuitry 112.

Interconnections 126 further include a second set of j interconnections 504 that provide j-bit flits from a NPS 552 of NoC circuitry 112 to TNICB circuitry 210.

Further in the example of FIG. 5, interconnections 124 include a first set of interconnections 508 that provide transmissions to RNICB circuitry 208.

Interconnections 124 further include a second set of interconnections 512 that transmit from TNICB circuitry 210.

Remaining ones of interconnections 124 may be used by other NICB circuitry (e.g., NICB circuitry 554, 556, and 558), such as for streaming data, or may be unused.

As a non-limiting example, in an embodiment:
interconnections 502 may include approximately 288 interconnections to provide 288-bit flits from RNICB circuitry 208 to NoC circuitry 112;
interconnections 504 includes approximately 288 interconnections to provide 288-bit flits from NoC circuitry 112 to RNICB circuitry 208;
interconnections 508 may include approximately 80 interconnections, of which 72 may be used to receive a 288 bit flit in four 72-bit segments at RNICB circuitry 208; and
interconnections 512 may include approximately 80 interconnections, of which 72 may be used to transmit a 288 bit flit in four 72-bit segments from TNICB circuitry 210.

Remaining ones of interconnections 508 and 512 may be reserved for mapping, parity, etc.

In an embodiment, NoC circuitry and NICB circuitry 120 communicate over interconnections 126 at a first transmission rate, and NICB circuitry 120 and NICB circuitry 122 communicate over interconnections 124 at a second transmission rate. The first and second transmission rates may be set such that a bandwidth of interconnections 126, measured over time, is equal to a bandwidth of interconnections 124. For example, in FIG. 5, TNICB circuitry 210 may receive a 288 bit flit from NoC circuitry over 288 interconnections 502 at a first transmission rate of 1 GHz, and may transmit the 288 bit flit in four 72-bit segments over interconnections 508 at a second transmission rate of 4 GHz.

In FIG. 5, interconnections 508 are illustrated as a pair of k-bit receive-side data words, DW1 and DW2, designated here as 520 and 522, respectively. Similarly, interconnections 512 are illustrated as a pair of transmit-side data words. DW1 and DW2, designated here as 524 and 526, respectively. Further to the foregoing example, each data word may represent approximately 40 interconnections, 36 of which may be used to transmit memory-mapped data. Remaining interconnections may be used or reserved for mapping, parity, etc.

Further In FIG. 5, NICB circuitry 120 includes a protocol handling unit (PHU) 540 that includes receiver circuitry 542 and 544 that receive data words (DWs) 520 and 522 respectively. PHU 540 further includes transmit circuitry 546 and 548 that transmits DWs 524 and 526, respectively.

In the example of FIG. 5, NICB circuitry 120, 554, 556, and 558 provide a total of 8 receive DWs and 8 transmit DWs. At 256 bits per DW, for example, NICB circuitry 120, 554, 556, and 558 provide a bandwidth of 2 tera bits per second (Tbps) in each direction. In another example, 16 DWs are provided in each direction, for a bandwidth of 16×256=4 Tbps in each direction.

NICB Signal Mapping

NICB signal mapping is described below with reference to FIG. 6.

Figure 6:
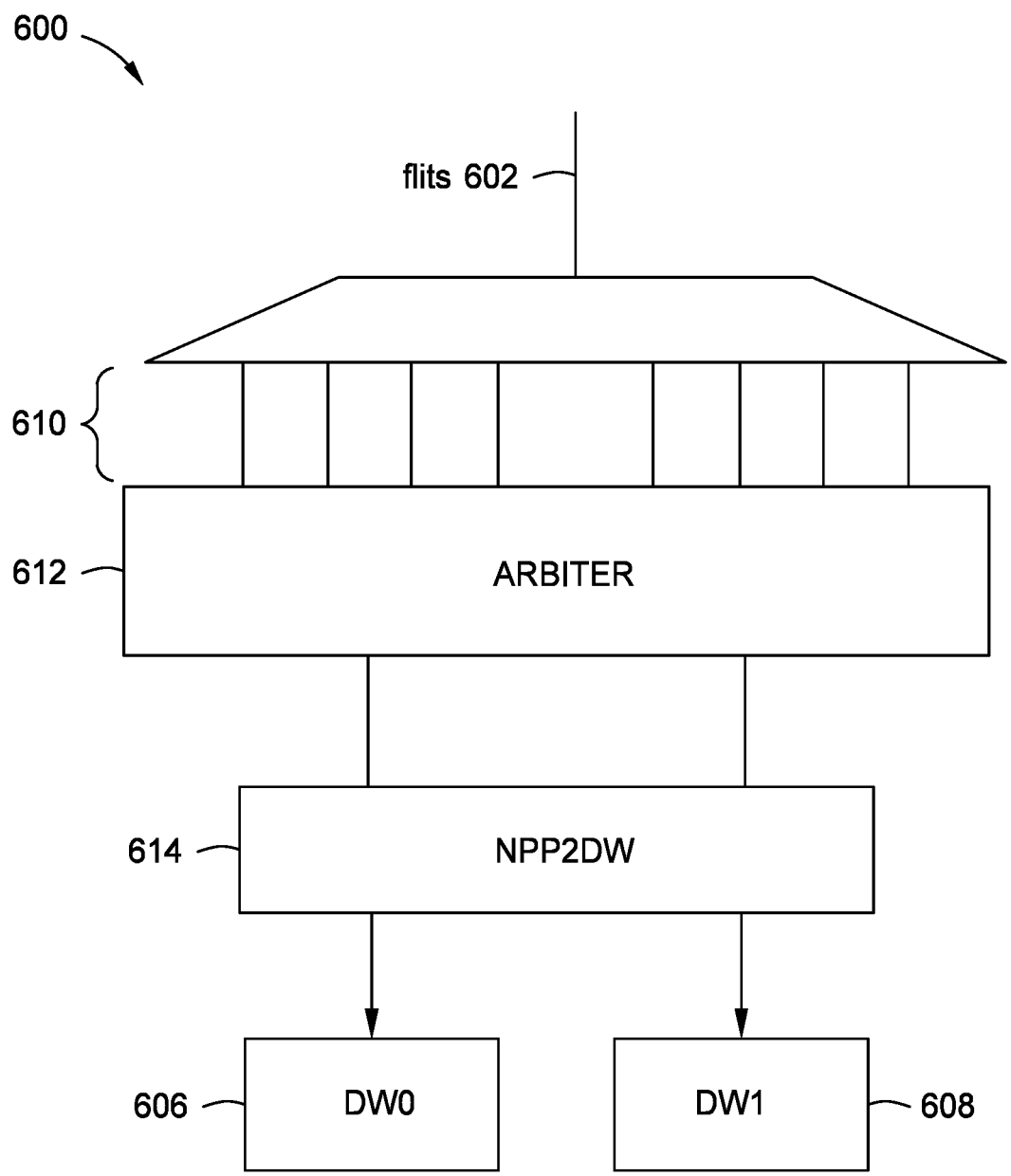
FIG. 6 is a conceptual illustration of a network-on-a-chip inter-chip bridge (NICB) infrastructure, according to an embodiment.

FIG. 6 is a conceptual illustration of an NICB infrastructure 600, according to an embodiment. NICB infrastructure 600 includes virtual channels 610, arbiter circuitry 612, and NPP2DW circuity 614 that maps NPP flits to DW0 606 and DW1 608.

In an embodiment, when a flit 602 is mapped to DW0 606 and DW1 608, the signal mapping is 1:1, in that all bits of flit 602 are directly mapped to DW0 606 and DW1 608 (e.g., to/from least significant bits (LSBs) of DWs 606 and 608), The signals may retain their semantic definitions. A C2C protocol layer may use a subset of the signals internally, examples of which are provided in the table below.

| Bit | Description |
| --- | --- |
| ECC | ECC will be terminated at RNICB (poison bit generated) and regenerated after address translation/SMID translation |
| DEST ID | New destination ID will be generated at the receiver side |
| AXUSER (SMID) | New SMID will be generated |
| AXPROT | Receiver may change the value of the protection bit |

When mapping flit 602 across DWs 606 and 608, circuitry associated with DWs 606 and 608 may operate in a lock-step mode. Arbitration may be performed with respect to one of DWs 606 and 608, and payload may be carried by the other one of DWs 606 and 608.

On the receive-side, a framing check may be performed for alignment purposes. The framing check may be performed with circuitry that is also used for a flow controlled streaming mode. An example is provided further below with reference to FIG. 7.

In addition to the other signals, NICB circuitry may use some bits of DW0 606 or DW1 (e.g., four bits) to map virtual channel (VC) credits. The VC credits may be transported over C2C interconnections by piggy backing on neighboring (pairing) DWs. This may be similar to a streaming transmission.

Figure 7:
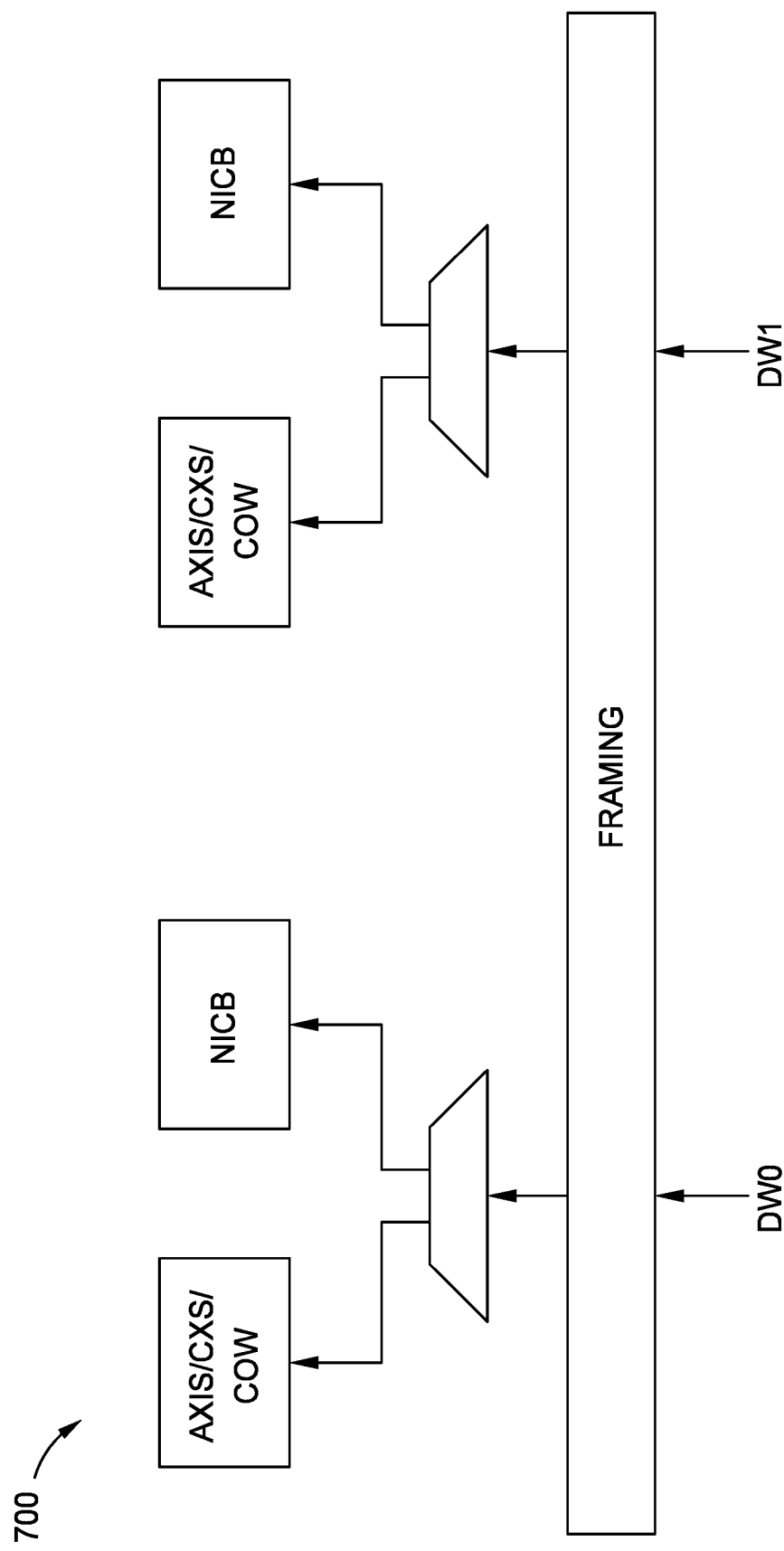
FIG. 7 is a conceptual illustration of a framing check architecture for memory-mapped traffic and streaming, according to an embodiment.

FIG. 7 is a conceptual illustration of a framing check architecture 700 for memory-mapped traffic and streaming, according to an embodiment. In addition to the regular signals, NICB circuitry may use four bits of a DW to map VC credits. As with streaming, credits may be transported to the other side by piggy backing on neighboring (pairing) DW(s).

Transmit Side (TNICB)

Example TNICB features are described below with reference to FIG. 8.

Figure 8:
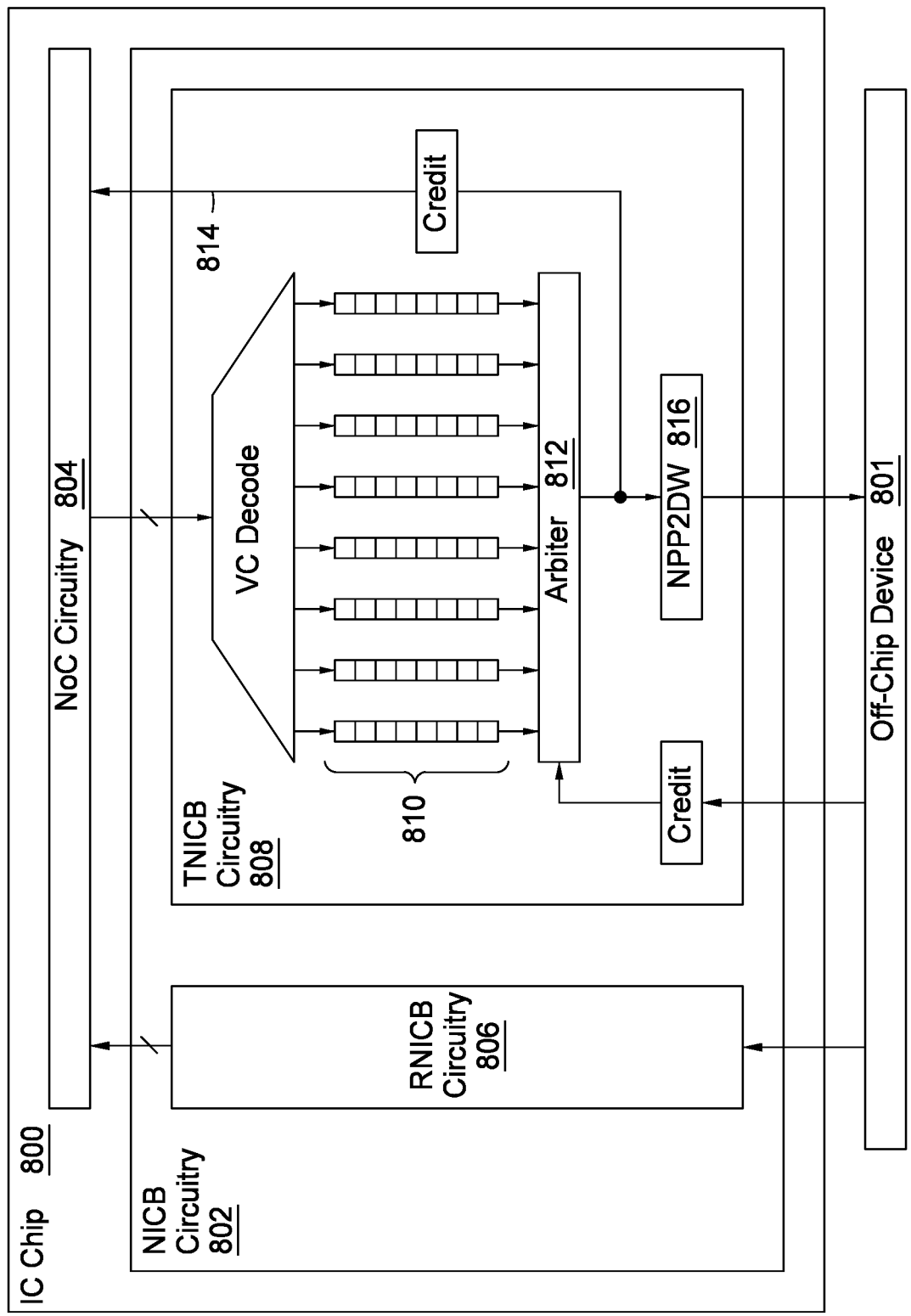
FIG. 8 is a block diagram of an integrated circuit chip to illustrate features of transmit NICB (TNICB) circuitry, according to an embodiment.

FIG. 8 is a block diagram of an IC chip 800. IC chip 800 may represent anchor 102 or chiplet 104A. IC chip 800 includes NICB circuitry 802 that interfaces between NoC circuitry 804 and an off-chip device 801. NICB circuitry 802 includes RNICB circuitry 806 and TNICB circuitry 808.

TNICB circuitry 808 includes VC buffers 810, which may be operated as first-in first-out (FIFO) buffers. Each of VC buffers 810 buffer may be associated with a respective transmit-side virtual channel (VC).

Flow control is achieved by sending a per-VC credit 814 back to NoC circuitry 804 when there is a pop from a respective one VC buffers 810. TNICB circuitry 808 may be initialized with credits to match a corresponding RNICB FIFO size.

TNICB circuitry 808 further includes arbiter circuitry 812. When an incoming transfer is received from NoC circuitry 804, arbiter circuitry 812 performs a VC decoding/arbitration operation to assign the incoming transfer into one of VC buffers 810 of an assigned VC. Arbitration may be similar to a deficit round-robin process of NoC circuitry 804. Other types of arbitration may also be employed, such as least recently used arbitration.

TNICB circuitry 808 further includes mapping circuitry, illustrated here as NPP2DW circuitry 816, that performs signal mapping.

Receive Side (RNICB)

Example RNICB features are described below with reference to FIG. 9.

Figure 9:
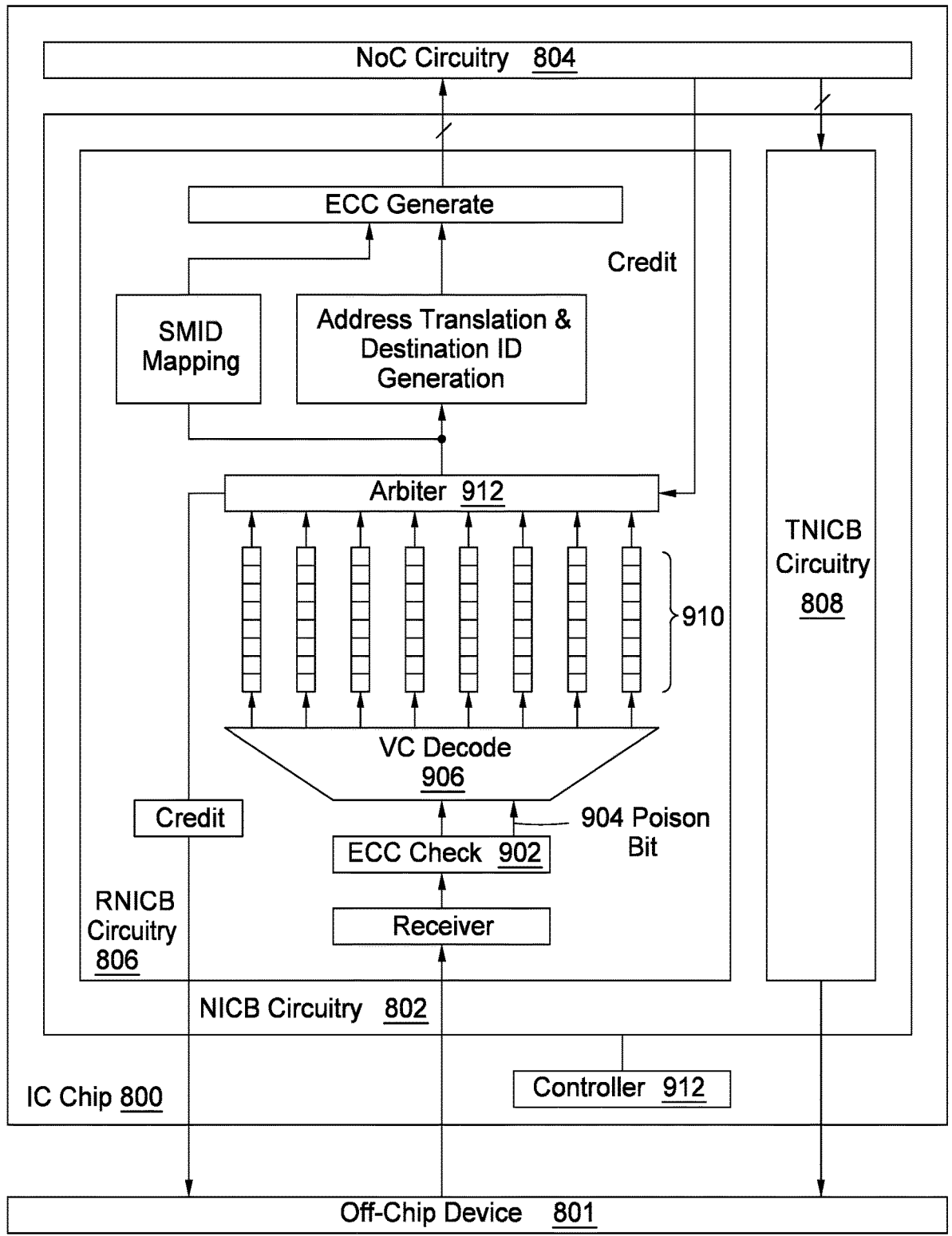
FIG. 9 is another block diagram of the integrated circuit chip of FIG. 8 to illustrate features of receive NICB (RNICB) circuitry, according to an embodiment.

FIG. 9 is another block diagram of IC chip 800, illustrating example features of RNICB circuitry 806, according to an embodiment.

RNICB circuitry 806 includes VC buffer 910, which may be operated as first-in first-out (FIFO) buffers. Each of VC buffers 910 may be associated with a respective receive-side VC.

RNICB circuitry 806 further includes ECC check circuitry 902 that generates a poison bit 904 that indicates whether received data is corrupt.

RNICB circuitry 806 further includes VC decode circuitry 906 that decodes a VC from a transfer received from off-chip device 801, and loads the transfer into a corresponding one of VC buffers 910.

RNICB circuitry 806 further includes arbiter circuitry 912, which may include deficit round-robin arbiter circuitry. Arbiter circuitry 912 may receive additional input from a read-reorder buffer (RROB). In an embodiment, a RD request only wins arbitration when RROB has space for at least one chop, and a WR request/data can only win arbitration when WR buffer has space to hold at least one chop.

Address Map Translation and Destination ID Re-Mapping
Address Decoding

In an embodiment, incoming addresses are converted to outgoing addresses dynamically.

In an embodiment, a RNICB generates destination IDs and SMIDs.

In an embodiment, a RNICB may change the priority of a transaction.

In an embodiment, a RNICB includes a programmable address decoder. FIG. 17 illustrates a table 1700 of example address decoder parameters, according to an embodiment.

Programmable registers of a RNICB may be similar to remap registers of a NMU, but with differentiated width. An example embodiment includes 32 remap registers at 64 KB granularity, 32 remap registers with 1 MB granularity, 16 remap registers at 64 MB granularity, and 16 remap registers at 64 MB granularity.

An address decoder may include a MASK register and an ADD register. Outgoing addresses may be computed as follows:

If (address_hit_remap_register_$X$)
Output_address=Input_address & MASK_$X$+
ADD_$X$, where $X$ denotes the remap register
where the input address found a hit.

SMID Mapping

In an embodiment, a NoC uses SMID as a unique identifier for each master. A programmable register may be used for SMID mappings (e.g., up-to 64 SMID mappings, or more). Each mapping may take an incoming SMID and map it to an outgoing SMID. If no ID matches, the incoming SMID may be used as-is as the outgoing SMID.

Priority

AN SMID lookup register may be used to set a priority bit (e.g., a AXPROT bit). The priority (e.g., AXPROT) bit may be retained if the SMID does not match the SMID of the (e.g., 64) registers.

RD Interleaving and RROB

RNICB circuitry 806 may support read (RD) interleaving read-reorder buffering (RROB), such as described below.

In an embodiment, incoming DWs from off-chip device 801 have an associated VC identifier (VC-ID). In an embodiment, RROB supports up to 8 RD VCs. Each VC may have a configurable register to set up a maximum number of outstanding requests (e.g., in bytes). NICB circuitry 802 may throttle requests on the VC if the maximum number of outstanding requests is reached.

In an embodiment, a mapping is be created to map the incoming VC to one of the read-reorder buffers (RROBs). For example, VC0, VC1, and VC2 may be mapped to RD REQ. VC0, VC1, and VC2 may also be mapped to RD_RESP in the opposite direction (TNICB).

For a request appearing on VC0, NICB circuitry 802 may chop the transaction, interleave if needed, and store RROB information in the RROB. On the response side, for a response appearing on VC0, the RROB is updated.

An entry into the RROB may include a key generated by concatenating identifiers received in the DW (e.g., VC-ID, SRC-ID, and TAG-ID), and a locally generated identifier (L-TAG-ID). Ordering of responses on the given concatenate identifier, {VC-ID, SRC_ID, TAG-ID, L-TAG-ID}, may be preserved. NICB circuitry 802 may use the {VC-ID, SRC-ID, TAG-ID} tuple in a manner similar to how a NMU uses an identifier.

In an embodiment, if (local_tag_id, VC, SRC-ID, TAG-ID) is occupied in RROB, NICB circuitry 802 may add (local_tag_id, VC, SRC-ID, TAG-ID) to candidates.

NICB circuitry 802 may arbitrate across candidates, such as with NPS arbitration circuitry, and may send a response over a C2C interface and update states (i.e., bookkeeping).
Write Tracking NICB circuitry 802 may apply write tracking to multiple VCs. In an embodiment, NICB circuitry 802 applies tracking to up-to 2 VCs. NICB circuitry 802 may apply write tracking in a manner similar write tracking applied by NMU circuitry.

NICB circuitry 802 may use {SRC_ID, TAG_ID} tuple to index into the writer tracker. The PROB may perform similarly.
RNIC Buffering In an embodiment, VC buffers, such as VC buffers 910, have a fixed depth (i.e., a fixed number of entries) that is sufficient to cover round-trip latency. VC buffers 910 may each include, for example, approximately 25 FIFO entries. Over 8 VCs, this corresponds to approximately 200 entries.

VC buffers 910 may include one or more optimizations, which may be implemented individually and/or in combination with one another.

In a first optimization VC buffers 910 are implemented as static random-access memory (SRAM) cells.

In another optimization, a buffer pooling approach is utilized to dynamically control depths of each of VC buffers 910. The buffer pool allows the assignment of VC to buffer entry to be controlled dynamically. A buffer pool approach may utilize programmable registers that specify next IDs. In this way, each VC is allocated a virtual FIFO whose depth can be changed at runtime. Such buffer pooling is referred to herein as dynamically configurable NICB buffering.

In a further optimization, another set of programmable registers may be used to dynamically specify a start-ID of each VC. This may be useful to provide fine-grained redundancy (i.e., by moving the pointers around). This may be useful to bypass relatively individual FIFO entries rather than an entire block of memory cells when one of the memory cells fails.

In FIG. 9, IC chip 800 includes controller circuitry that dynamically configures RNICB buffering and dynamically specifies start-IDs. Dynamically configurable RNICB buffering and dynamic specification of start-IDs are further described below with reference to FIGS. 10-13.

Figure 10:
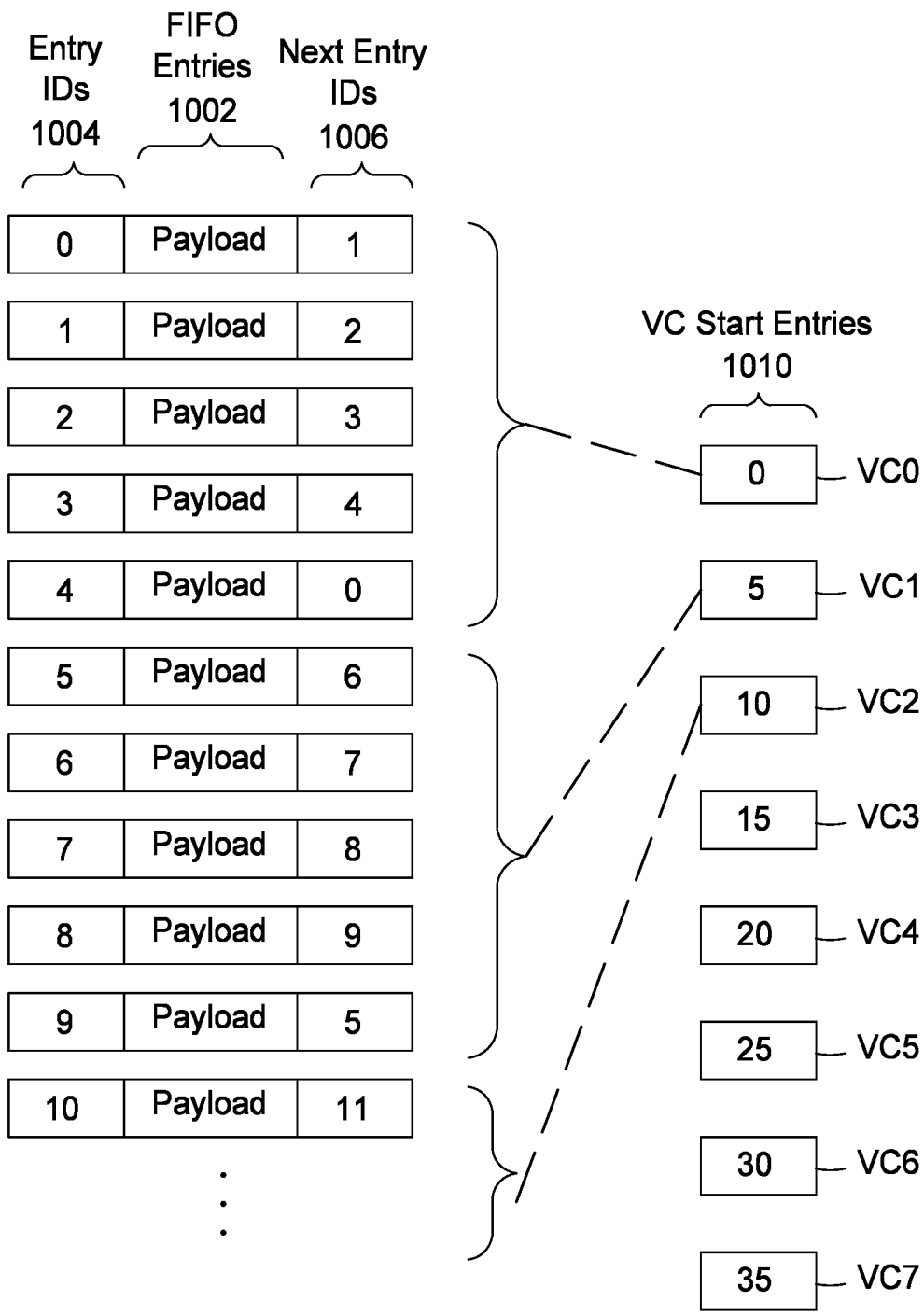
FIG. 10 is a conceptual illustration of configurable virtual channel (VC) buffers and VC start-ID registers in a first configuration, according to an embodiment.

FIG. 10 is a conceptual illustration of configurable VC buffers and VC start-ID registers in a first configuration, according to an embodiment.

Figure 11:
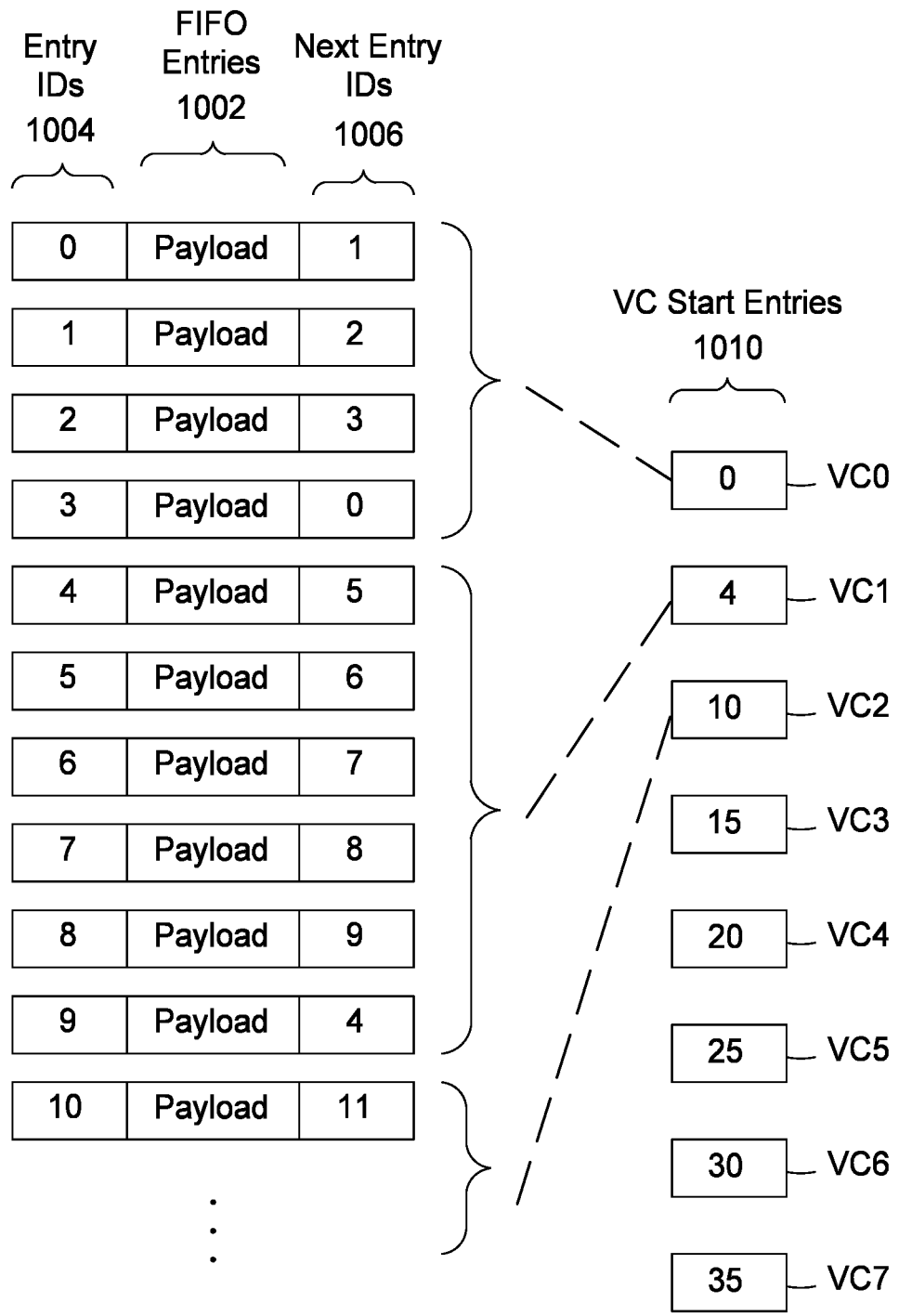
FIG. 11 is a conceptual illustration of the configurable VC buffers and the VC start-ID registers in a second configuration, according to an embodiment.

FIG. 11 is a conceptual illustration of the configurable VC buffers and the VC start-ID registers in a second configuration, according to an embodiment.

Figures 12, 13:
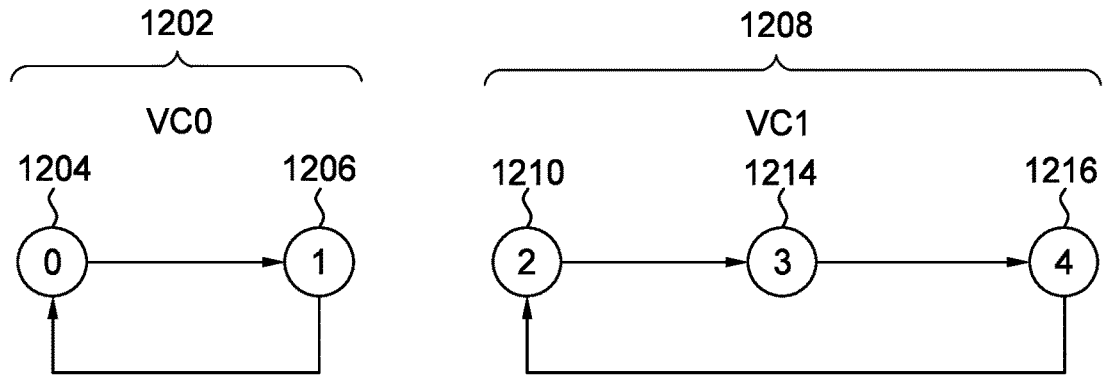
FIG. 12 is a conceptual illustration of two VCs configured with unequal numbers of FIFO buffer entries, according to an embodiment.
FIG. 13 is a table that illustrates simplified read and write examples for FIG. 12.

FIG. 12 is a conceptual illustration of two VCs configured with unequal numbers of FIFO buffer entries, according to an embodiment.

FIG. 13 is a table 1300 that illustrates simplified RD and WR examples for FIG. 12.

FIG. 10 illustrates FIFO buffer entries 1002, next entry IDs 1006, entry IDs 1004, and VC start entries 1010. Each of FIFO buffer entries 1002 is associated with a respective one of entry IDs 1004 and a respective one of next entry IDs 1006.

FIFO buffer entries 1002 hold payloads, and may be implemented in SRAM. Next entry IDs 1006 may be stored in the respective FIFO buffer entries 1002 or in registers. VC start entries 1010 may be stored in respective registers.

In the example of FIG. 10, there are eight VC start entries 1010, each associated with a respective one of eight VCs, denoted here as VC0 through VC7. Each of the VC start entries 1010 indicates a starting entry ID for the respective VC.

In this example, VC0 starts at VC entry 0, VC1 starts at VC entry 5, and VC2 starts at VC entry 10. VC0 thus includes 5 FIFO buffer entries, identified here as entry IDs 0, 1, 2, 3, and 4. VC1 also includes 5 FIFO buffer entries, identified here as entry IDs 5, 6, 7, 8, and 9.

Next entry IQs 1006 serve as pointers to the next available FIFO entries for the respective VCs. Next entry IDs 1006 essentially create a circular linked-list for each VC, For example, the next entry IDs 1006 for VC0 cycle through entry IDs 0, 1, 2, 3, 4, then back to 0. The next entry IDs 1006 for VC1 cycle through entry IDs 5, 6, 7, 8, 9, then back to 5.

The architecture of FIG. 10 permits reconfiguration of the VC buffer depths programmatically, in that next entry IDs 1006 and VC start entry registers may be re-programmed to increase or decrease a VC's depth.

The architecture of FIG. 10 also permits changing VC start entries 1010 without necessarily changing the depth of any of the VCs (Le., by changing next entries IDs to maintain existing depths). This may be useful to bypass a relatively small set or block of memory cells when a fault is detected within the block.

In FIG. 11, within VC start entries 1010, the VC start entry for VC1 is changed from 5 to 4, relative to FIG. 10. Other entry VC start entries remain unchanged. In this example, VC0 now starts at VC entry 0, VC1 starts at VC entry 4, and VC2 starts at VC entry 10. VC0 now includes 4 FIFO buffer entries, identified here as entry IDs 0, 1, 2, and 3. This is one less entry than in FIG. 10. VC1 now includes 6 FIFO buffer entries identified, here as entry IDs 4, 5, 6, 7, 8, and 9. This is one more entry than in FIG. 10. Next entry IDs 1006 for VC0 and VC1 are updated accordingly.

In FIG. 12, a first VC 1202, illustrated here as VC0, has two FIFO buffer entries 1204 and 1206, illustrated here as entries 0 and 1. A second VC 1208, illustrated here as VC1, has three FIFO buffer entries 1210, 1214, and 1216, illustrated here as entries 2, 3, and 4. The FIFO buffer entries of VC0 and VC1 are used in a circular fashion, such as illustrated in the example of FIG. 13.

In FIG. 13, all FIFO buffer entries are initially empty. With each WR/RD, RD and WR pointers (i.e., RD next entry ID 1302 and WR next entry ID 1304) change as shown, generating FULL/EMPTY signals as shown.

With the buffer pooling methodology disclosed herein. NICB circuitry may operate with fewer overall buffer entries than an architecture that uses a fixed number of buffer entries. This is because, typically, only a few VCs are active at any given time. By tuning VC buffers for specific use cases, the buffer entries may be multiplexed across multiple VCs.

Streaming Support

For streaming data, RNICB circuitry may support mapping of an incoming identifier (e.g., a TDEST-ID) to an outgoing destination identifier (destination ID). NoC circuitry may be configured or programmed to allow more than one destination ID to be routed to TNICB circuitry. Each destination ID routed to TNICB circuitry may thus be mapped to a different destination ID in the RNICB circuitry.

C2C/NICB Compressed Mode

In an embodiment, NICB circuitry operates in a compressed mode in which packetized memory mapped traffic is mapped to interconnections 124 in a less-than 1:1 fashion (e.g., k of interconnections 124).

In an embodiment, NICB circuitry is configurable in each of multiple modes. NICB circuitry may be configurable in one of multiple selectable modes at boot time. Example modes are described below with reference to NICB circuitry 120. NICB circuitry 120 is not, however, limited to the examples below.

In a first mode, also referred to herein as full mode or uncompressed mode, NICB circuitry 120 maps packetized memory-mapped traffic to interconnections 124 in a 1:1 manner, such as described in examples above. In FIG. 5, for example, NICB circuitry 120 maps packetized memory-mapped traffic to DWs 520 and 522 (i.e., two sets of k interconnections 124).

In a second mode, referred to herein as compressed mode or high-data word (DW) performance mode, NICB circuitry 120 maps packetized memory-mapped traffic to fewer interconnections 124 than the high-performance mode (i.e., in a less-than 1:1 fashion). In FIG. 5, for example, NICB circuitry 120 may map packetized memory-mapped traffic to DW 520 (i.e., a single set of k interconnections 124). In the example of FIG. 5, NICB circuitry may pack a 256-bit flit into 1 DW.

NICB circuitry 122 of anchor 102 may be configured similar to NICB.

The compressed mode may provide an efficient mapping of NPP traffic from interconnections 126 to interconnections 124 with relatively little added latency and computations.

Further to the example above, In FIG. 5, in the compressed mode:
 RNICB circuitry 208 may receive a 288 bit flit in eight 36-bit segments over DW 520; and
 TNICB circuitry 210 may transmit a 288 bit flit in eight 36-bit segments over DW 524.

As described further above, in an embodiment. NoC circuitry and NICB circuitry 120 communicate over interconnections 126 at a first transmission rate, and NICB circuitry 120 and NICB circuitry 122 communicate over interconnections 124 at a second transmission rate. The first and second transmission rates may be set such that a bandwidth of interconnections 126, measured over time, is equal to a bandwidth of interconnections 124. For example, in FIG. 5, in the compressed mode, TNICB circuitry 210 may receive a 288 bit flit from NoC circuitry over 288 interconnections 502 at a first transmission rate of 1 GHz, and may transmit the 288 bit flit in eight 36-bit segments over interconnections 508 at a second transmission rate of 8 GHz.

The high-performance mode may be useful to maximize the performance of a single interface, perhaps at the expense of reducing the overall bandwidth of a C2C interface. Whereas the high-DW-performance mode may be useful to maximize utilization of a DW, perhaps at the expense of lower performance for each memory mapped interface.

Example mapping semantics are described below.

For a write request (WR REQ) that originates at functional circuitry 108, TNICB circuitry 210 may separate the WR REQ from write data (WR Data), and send the WR REQ and the WR Data as separate flits, For the WR REQ flit, TNICB circuitry 210 may save a TAG-ID of the write request for association with a write response, compute ECC on the WR REQ flit; and send the WR REQ flit to RNICB circuitry 218 over interconnections 124. Upon receipt of the WR REQ flit, RNICB circuitry 218 stores the VC-ID and Tag-ID, and performs WR processing.

For the WR Data flit, TNICB circuitry 210 may compute a strobe (STRB) and ECC for inclusion with the WR Data (e.g., 256 bits), and send the WR Data flit to RNICB circuitry 218 over interconnections 124.

In an embodiment, TNICB circuitry 210 attempts to encode the STRB into a predetermined number of bits (e.g., 10 bits, Start-End). If the encoding is successful, TNICB circuitry 210 sends the encoded STRB, ECC, and WR Data in a single WR Data flit over interconnections 124. If the encoding is unsuccessful (i.e., the STRB is encoded in more than the predetermined number of buts), TNICB circuitry 210 sends the encoded STRB, ECC, and WR Data, in multiple WR Data flits with a flag included with at least the first one of the multiple WR Data flits.

For example, TNICB circuitry 210 may set a VC-ID of the first WR Data flit to a predetermined or reserved value to indicate that this is a first of multiple WR Data flits. TNICB circuitry 210 may include as many bits of the WR Data as will fit in the first WR Data flit and place remaining bits of the WR Data in a subsequent WR Data flit.

At anchor 102, RNICB circuitry 218 detects the predetermined or reserved VC-ID in the first WR Data flit, stores the WR Data of the first WR data flit, and waits for a subsequent WR Data flit. When RNICB circuitry 218 receives the subsequent WR Data flit, RNICB circuitry 218 concatenates the WR Data flits, performs WR data processing, and forwards the concatenated WR Data flit to NoC circuitry 114 over interconnections 132.

For write request involving streaming data (STRM data) in the compressed mode, TNICB circuitry 210 may attempt to encode handshaking signaling (e.g., TKEEP), into a predetermined number of bits (e.g., 6 bits). If unsuccessful, TNICB circuitry 210 may send the streaming data over interconnections 124 in multiple flits such as described above with respect to WR Data. TNICB circuitry 210 may, for example, set a VC-ID of a first streaming data flit to a predetermined or reserved value to indicate that the current word is the first set of bits (e.g., the first 288 bits) of the streaming data, and provide remaining bits of the streaming data in a subsequent streaming data flit.

At anchor 102, RNICB circuitry 218 detects the predetermined or reserved VC-ID in the first streaming data flit, stores the data of the first streaming data flit, and waits for a subsequent streaming data flit. When RNICB circuitry 218 receives the subsequent streaming data flit. RNICB circuitry 218 concatenates the streaming data flits, performs STRM processing, and forwards the concatenated streaming data flit to NoC circuitry 114 over interconnections 132.

TNICB circuitry 210 may remove one or more predetermined bits (e.g., DST and DST parity bits) from the streaming data flits, re-compute ECC based on remaining bits, and send the flits to RNICB circuitry 218 over interconnections 124, without a STRM traffic type indication. In this example, RNICB circuitry 218 uses VC mapping to determine the STRM traffic type.

For STRM data, C2C interface circuitry 118A may support a predetermined number of handshake bits (e.g., 4 bits of TDEST and 3 bits of TID).

TNICB circuitry 210 may encode one or more handshake signals (e.g., VALID) into one or more VC numbers (e.g., VC numbers 9 through 14). This may be useful to assist in deriving the STRM traffic type. In this example, RNICB circuitry 218 may map the handshake signal(s) back to the corresponding WR VC, such as illustrated in FIG. 14.

Figure 14:
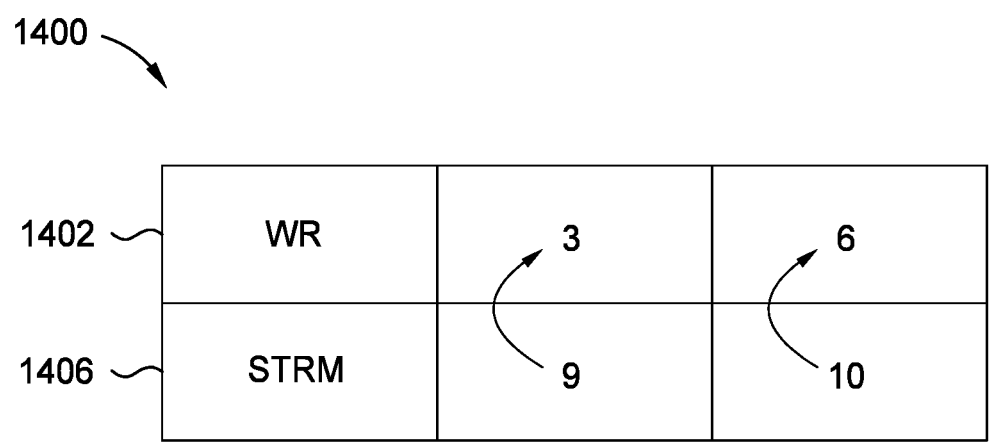
FIG. 14 illustrates an example mapping between write requests (WRs) streaming requests, according to an embodiment.

FIG. 14 illustrates an example mapping 1400 between WRs 1402 and STRM 1406, according to an embodiment. In the example of FIG. 14, WRs 1402 are configured on VCs 3 and 6. The corresponding VCs for STRM 1406 are 9 and 10, where 9 maps back to 3 and 10 maps back to 6.

When responding to a write request involving streaming data in the compressed mode, TNICB circuitry 220 may look up a source identifier (SRC ID) and recreate a DW flit. TNICB circuitry 220 may send a write response (WR RESP) only for a last chop. RNICB circuitry 208 may send the flit to NoC circuitry 112.

Read Request (RD REQ)

In an embodiment, for a read request (RD REQ) that originates at functional circuitry 108, TNICB circuitry 210 saves an incoming identifier (e.g., Tag-ID), computes a local key, such as by appending a least significant bit of a source identifier (e.g., SRC-ID) and the incoming identifier, and stores the source identifier indexed by the incoming identifier. TNICB circuitry 210 then creates the read request using the local key as a new tag-ID, re-computes ECC, and sends the flit over interconnections 124.

At anchor 102, RNICB circuitry 218 performs RD REQ processing.

TNICB circuitry 220 receives a response flit (e.g., a RD-RESP flit) from functional circuitry 130 through NoC circuitry 114. In an embodiment, TNICB circuitry 220 strips off or removes a source identifier (e.g., SRC-ID) in the RD-RESP flit, re-computes ECC, and sends the flit to chiplet 104A over interconnections 124.

At chiplet 104A, RNICB circuitry 208 receives the RD-RESP flit, uses the incoming identifier (e.g., TAG-ID) to recover the original Tag-ID and SRC-ID, updates the RD-RESP flit, re-computes ECC, and sends the RD-RESP flit to NoC circuitry over interconnections 126.

Credits and Valid

NICB circuitry may use credit and valid signals to control loading of VC buffers. In an embodiment, only one credit signal is sent in a given cycle. In this example, the credit and valid signals may each be encoded into a predetermined number of allocated bits (e.g., 4 allocated bits each).

In the compressed mode, NICB circuitry may map a flit type to the respective VC. NICB circuitry may also send a WR REQ flit followed by all the data flits corresponding to the WR REQ flit. In an embodiment, NICB circuitry does not perform interleaving within a VC. In another embodiment, NICB circuitry performs interleaving within a VC. In an embodiment, NICB circuitry performs one or more of the foregoing features in the full or uncompressed mode as well.

Additional example embodiments of uncompressed/full mode and compressed mode are provided below.

In an embodiment, in the full mode, a j-bit flit is mapped to 2 DWs (I.e., 1:1 mapping). In the compressed mode, a j-bit flit is mapped to one OW (I.e., less than 1:1 mapping).

In an embodiment, in the full mode, a WR flit occupies 2 DWs, and data can accompany the WR in the same flit. In compressed mode, a WR request and WR data may be sent in consecutive flits.

In an embodiment, in the full mode, bits of valid (e.g., 8 bits) and bits of credit (e.g., 8 bits) may be used for each flit. In the compressed mode, the vide and credit bits may encoded (e.g., as bits 1 through 15). In an embodiment, a valid value of 0 indicates "not valid," and a credit value of 0 indicates "no credit." A VC-ID value (e.g., VC-15) may be reserved to indicate partial transfer. A set of VC-IDs (e.g., VC-IDs 9 through 14), may be reserved for STRM mapping.

In an embodiment, in the full mode, WR data STRBs are not encoded. In compressed mode, WR data STRBs may be encoded (e.g., into 10 bits). If the encoding is not successful, the data flit may be sent in two consecutive flits.

In an embodiment, STRM may incorporate one or more of the foregoing features.

NICB-LITE

In an embodiment, NICB circuitry is configured as "light" circuitry (NICB-LITE) that utilizes a reduced number of VCs (e.g., 4 VCs versus 8 VCs). NICB circuitry may be fabricated as NICB-LITE circuitry or may be re-configurable between a full contingent of VCs and a reduced number of VCs. In an embodiment, NICB-LITE circuitry operates exclusively in the compressed mode. Alternatively, NICB-LITE circuitry may operate the full mode. NICB-LITE circuitry may include or utilize one or more features described above with respect to compressed mode and/or full mode. NICB-LITE circuitry may be useful for chiplets/applications that do not necessarily need a full contingent of VCs. In an embodiment, NICB-LITE circuitry utilizes a reduced-size RROB (e.g., 16 KB versus 8 KB).

Figure 15:
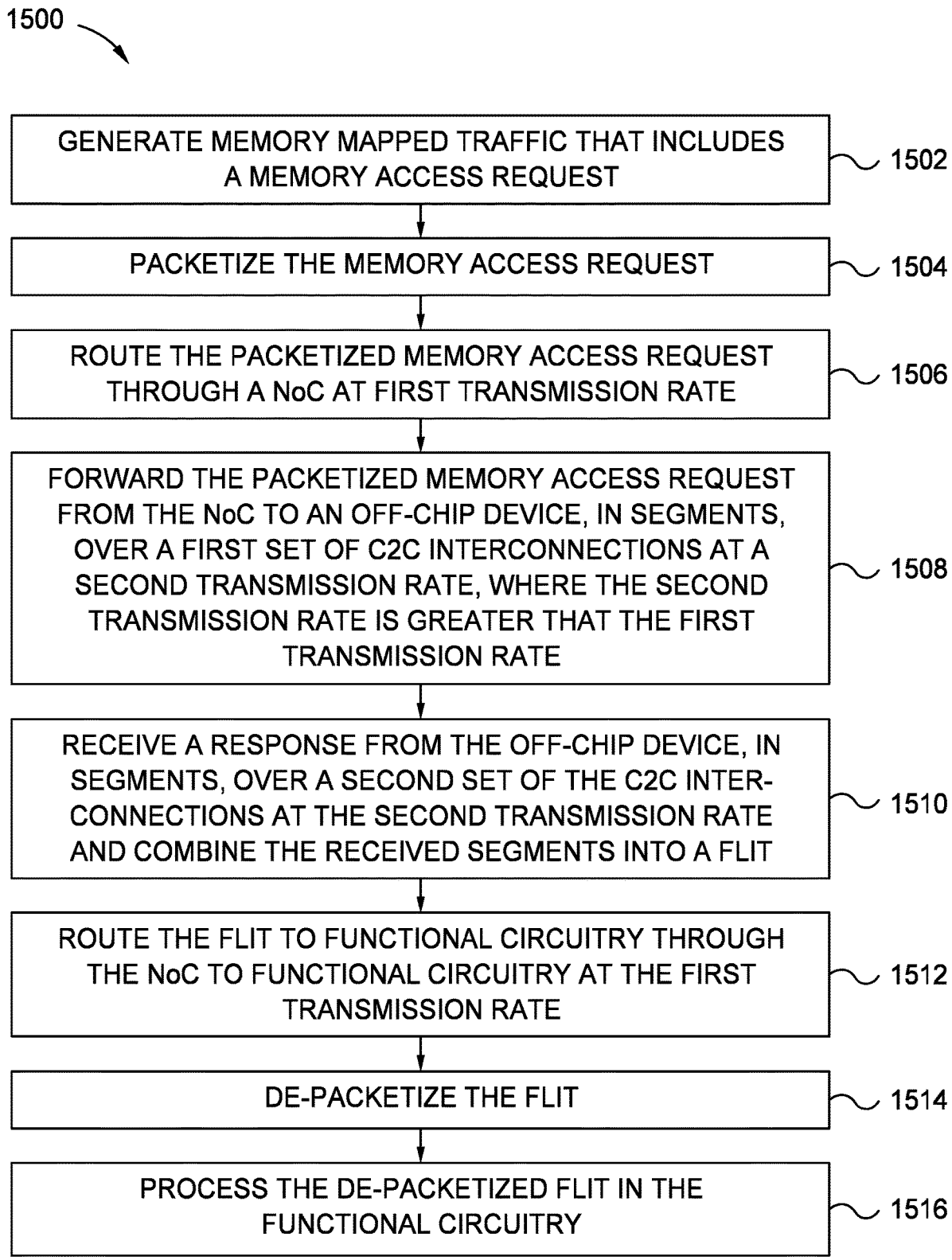
FIG. 15 illustrates a method of transmitting memory mapped traffic to an off-chip device, according to an embodiment.

FIG. 15 illustrates a method 1500 of transmitting memory mapped traffic to an off-chip device, according to an embodiment. Method 1500 is described below with reference to chiplet 104A. Method 1500 is not, however, limited to the example of chiplet 104A.

At 1502, functional circuitry 108 generates memory mapped traffic that includes a memory access request.

At 1504, NMU circuitry 204 packetizes the memory access request.

At 1506, NPS 202 routes the packetized memory access request to TNICB circuitry 210 at a first transmission rate.

At 1508, TNICB circuitry 210 forwards the packetized memory access request from NPS 202 to anchor 102, in segments, over a first set of interconnections 124 at a second transmission rate, where the second transmission rate is greater than the first transmission rate. TNICB circuitry 210 may utilize one or more features described in other examples herein.

At 1510, RNICB circuitry 208 receives a response from anchor 102, in segments, over a second set of interconnections 124, at the second transmission rate, and combines the segments into a flit. RNICB circuitry 208 may utilize one or more features described in other examples herein.

At 1512, NPS 202 routes the flit to NMU circuitry 204 at the first transmission rate.

At 1514, NMU circuitry 204 de-packetizes the flit.

At 1516, functional circuitry 108 processes the de-packetized flit.

Figure 16:
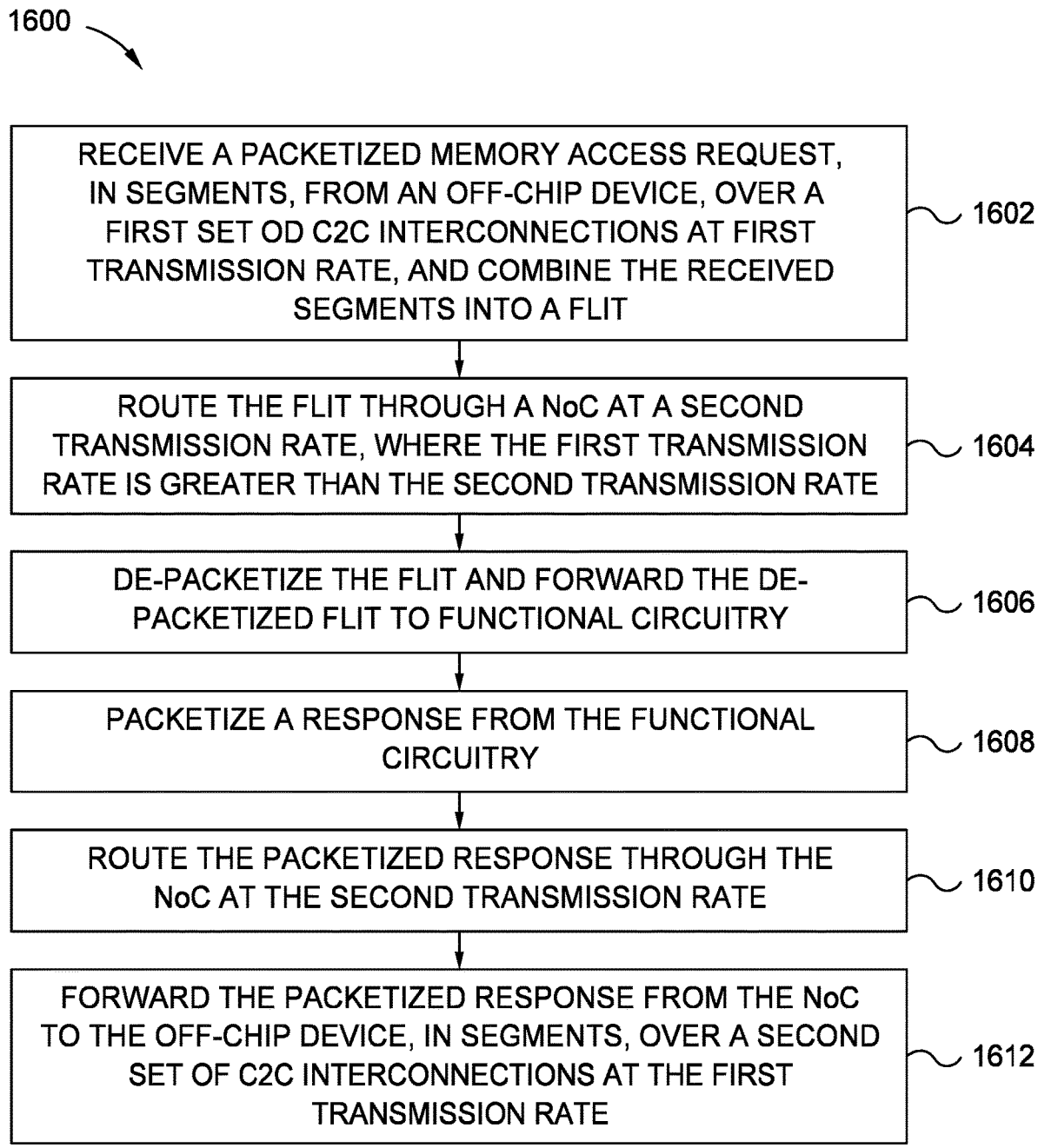
FIG. 16 illustrates a method of receiving and processing memory mapped traffic from an off-chip device, according to an embodiment.

FIG. 16 illustrates a method 1600 of receiving and processing memory mapped traffic from an off-chip device, according to an embodiment. Method 1600 is described below with reference to anchor 102. Method 1600 is not, however, limited to the example of anchor 102.

At 1602, RNICB circuitry 218 receives a packetized memory access request, in segments, from chiplet 104A, over a first set of interconnections 124 at first transmission rate, and combines the received segments into a flit, RNICB circuitry 218 may utilize one or more features described in other examples herein.

At 1604, NPS 212 routes the flit to NSU circuitry 216 at a second transmission rate, where the first transmission rate is greater than the second transmission rate.

At 1606, NSU circuitry 216 de-packetizes the flit and forwards the de-packetized flit to functional circuitry 130 for processing.

At 1608, NSU circuitry 216 packetizes a response from functional circuitry 130.

At 1610, NPS 212 routes the packetized response to TNICB circuitry 220 at the second transmission rate.

At 1612, TNICB circuitry 220 forward the packetized response to chiplet 104A, in segments, over a second set of C2C interconnections at the first transmission rate. TNICB circuitry 220 may utilize one or more features described in other examples herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s), in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) chip, comprising:
   functional circuitry configured to exchange memory mapped traffic with an off-chip device;
   network-on-a-chip (NoC) circuitry configured to packetize and de-packetize memory mapped traffic received from and directed to the functional circuitry, and to route the packetized memory mapped traffic between the functional circuitry and the off-chip device; and
   NoC inter-chip bridge (NICB) circuitry configured to interface between the NoC circuitry and the off-chip device, including to exchange the packetized memory mapped traffic with the off-chip device over chip-to-chip (C2C) interconnections.

2. The IC chip of claim 1, wherein the NICB circuitry is further configured to:
   perform address map translations and destination identifier re-mappings based on system management identifiers (SMIDs) associated with the packetized memory mapped traffic.

3. The IC chip of claim 1, wherein:
   the NoC circuitry is further configured to route a packetized memory access request to the NICB circuitry at a first transmission rate; and
   the NICB circuitry is further configured to transmit the packetized memory access request in segments over the C2C interconnections in a 1:1 mapping at a second transmission rate;
   wherein the second transmission rate is greater than the first transmission rate.

4. The IC chip of claim 1, wherein:
   the NoC circuitry is further configured to route a packetized memory access request to the NICB circuitry at a first transmission rate; and
   the NICB circuitry is further configured to transmit the packetized memory access in segments over the C2C interconnections in a less-than 1:1 mapping at a second transmission rate;
   wherein the second transmission rate is greater than the first transmission rate.

5. The IC chip of claim 4, wherein the NICB circuitry is further configured to:
   map a command portion of the packetized memory access request to a first flit;
   map a data portion of the packetized memory access request to one or more additional flits; and
   transmit the first flit and the one or more additional flits in segments over the C2C interconnections at the second transmission rate.

6. The IC chip of claim 5, wherein the packetized memory access request includes a write request and data, and wherein the NICB circuitry is further configured to:
   place the write request in the first flit;
   compute an error code based on the first flit;
   compute a strobe based on the data;
   encode the strobe;
   place the data, the error code, and the encoded strobe in the one or more additional flits; and
   transmit the first flit and the one or more additional flits in segments over the C2C interconnections.

7. The IC chip of claim 6, wherein the NICB circuitry is further configured to:
   place the data, the error code, and the encoded strobe in a single additional flit if a length of the encoded strobe is below a threshold; and
   place the data, the error code, and the encoded strobe across multiple additional flits and place a predetermined identifier in a first one of the additional flits to indicate that the first additional flit is one of multiple additional flits of the write request, if the length of the encoded strobe exceeds the threshold.

8. The IC chip of claim 1, wherein the NICB is further configured to:
   receive a packetized memory access request from the NoC circuitry;
   load the packetized memory access request in a first one of multiple virtual channel (VC) buffers;
   map contents of contents of the first VC buffer to a first set of segments and include an identifier with each segment of the first set of segments; and
   transmit the first set of segments to the off-chip device over the C2C interconnections.

9. The IC chip of claim 8, wherein:
   the NICB circuitry is further configured to receive a response to the memory access request from the off-chip device as a second set segments, load the second set of segments into a second one of the VC buffers based on identifiers contained within the segments of the second set of segments, concatenate the second set of segments as a flit, and forward the flit to the NoC circuitry; and
   the NoC circuitry is further configured to route the flit to the functional circuitry and de-packetize the flit.

10. The IC chip of claim 1, wherein the NICB circuitry is further configured to:
    receive first and second flits over the C2C interconnections; and
    concatenate the first and second flits based on a determination that the first flit includes a predetermined virtual channel identifier.

11. The IC chip of claim 1, wherein the packetized memory access request includes a read request, and wherein the NICB circuitry is further configured to:
    receive a response to a read request from the off-chip device in segments;

load the segments in respective entries of a first one of multiple virtual channel (VC) buffers based on identifiers contained within the segments;
re-order and concatenate the segments to provide a flit; and
communicate the flit to the NoC circuitry.

12. The IC chip of claim 1, wherein the NICB circuitry is configurable in each of a full mode and a compressed mode, and wherein:
the NoC circuitry is further configured to route a packetized memory access request to the NICB circuitry at a first transmission rate;
the NICB circuitry is configured in the full mode to transmit the packetized memory access request in segments of a first length over the C2C interconnections in a 1:1 mapping at a second transmission rate;
the NICB circuitry is configured in the compressed mode to transmit the packetized memory access in segments of a second length over the C2C interconnections in a less-than 1:1 mapping at a third transmission rate.

13. The IC chip of claim 12, wherein:
the third transmission rate is greater than the second transmission rate;
the second transmission rate is greater than the first transmission rate; and
the first length is greater than the second length.

14. The IC chip of claim 1, further comprising:
controller circuitry configured to dynamically configure a depth of each of multiple VC buffers and starting locations of the VC buffers.

15. The IC chip of claim 1, wherein the NICB circuitry is further configured to:
map streaming data across first and second flits;
include a predetermined identifier in the first flit to indicate that the second flit will follow; and
transmit the first and second flits to the off-chip device over the C2C interconnections.

16. The IC chip of claim 1, wherein the NICB circuitry is further configured to:
receive a flit over the C2C interconnections; and
determine that the flit is a streaming data flit based on a virtual channel mapping encoded within the flit.

17. An integrated circuit (IC) device, comprising:
functional circuitry configured to send and receive memory-mapped data to and from an off-chip device;
network-on-a-chip (NoC) circuitry configured to provide the functional circuitry with a virtual interface to the off-chip device; and
NoC inter-chip bridge (NICB) circuitry configured to provide the NoC circuitry with a virtual interface to the off-chip device.

18. A method, comprising, in an integrated circuit (IC) chip:
generating memory mapped traffic that includes a memory access request;
packetizing the memory access request;
routing the packetized memory access request through an on-chip packet-switched communication network at first transmission rate; and
forwarding the packetized memory access request from the on-chip packet-switched communication network to an off-chip device, in segments, over a set of chip-to-chip (C2C) interconnections at a second transmission rate;
wherein the second transmission rate is greater than the first transmission rate.

19. The method of claim 18, wherein the forwarding comprises:
performing address map translations and destination identifier re-mappings based on system management identifiers (SMIDs) associated with the packetized memory mapped traffic.

20. The method of claim 18, wherein the forwarding comprises:
mapping contents of the packetized memory access request to the C2C interconnections in a 1:1 mapping in a full mode; or
mapping contents of the packetized memory access request to the C2C interconnections in a less-than 1:1 mapping in a compressed mode.

* * * * *